Sept. 3, 1929.  F. L. MARSH  1,726,961
AUTOMOBILE SIGNAL
Filed Dec. 14, 1926
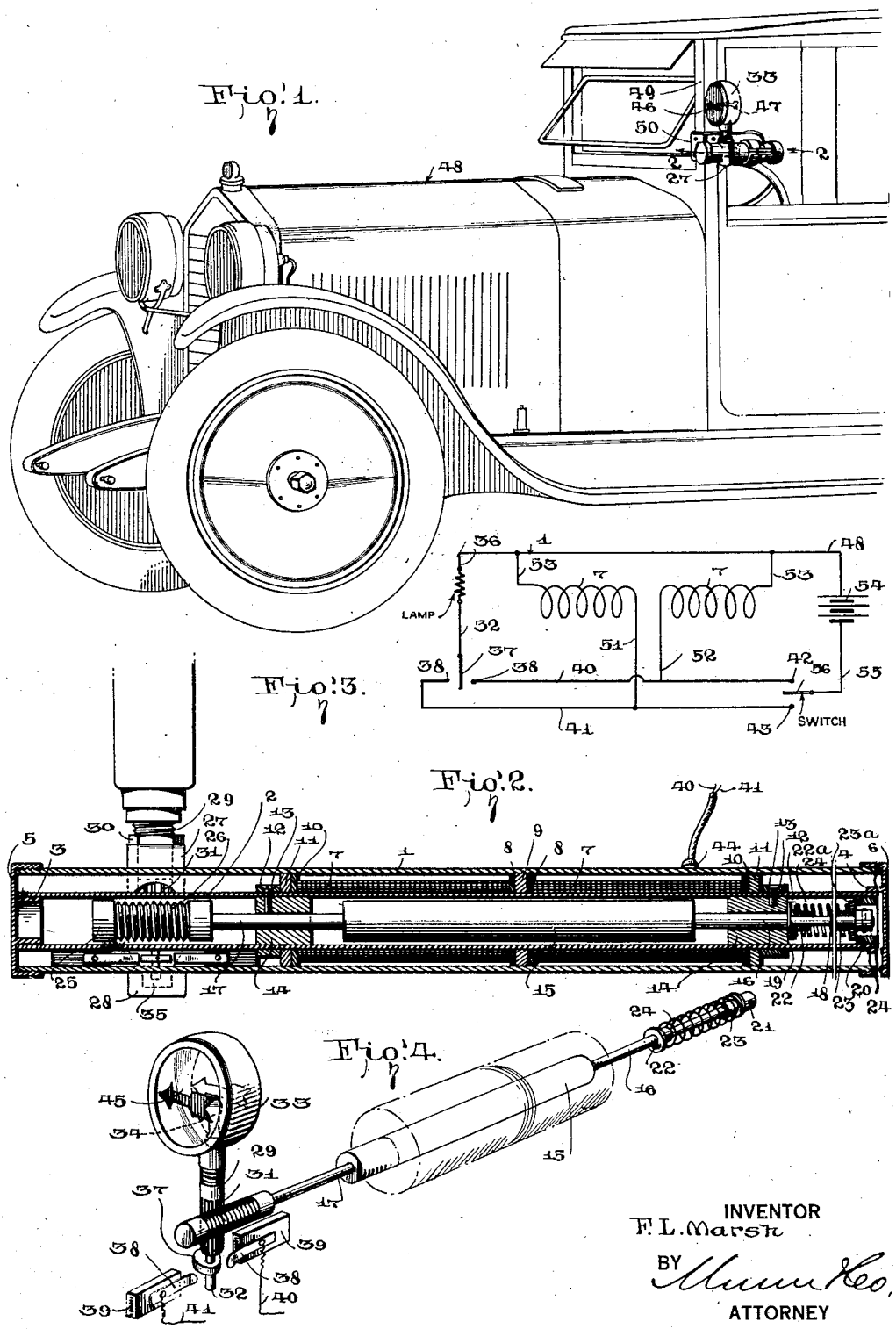
INVENTOR
F. L. Marsh
BY
ATTORNEY Patented Sept. 3, 1929.

1,726,961

UNITED STATES PATENT OFFICE.

FREDERICK LEONARD MARSH, OF THE DALLES, OREGON.

AUTOMOBILE SIGNAL.

Application filed December 14, 1926. Serial No. 154,783.

My invention relates generally to improvements in direction indicating signals for motor vehicles, more particularly to an electric operating mechanism for a signal of the type that is disclosed in United States Patent No. 1,428,136, granted September 5, 1922, to Messrs. Blinn and Christie, and it consists in the combinations, constructions and arrangements herein described and claimed.

An object of the invention is the provision of a signal operating mechanism of the character described that is adapted to be controlled by an electric switch which may be disposed on the instrument board, steering wheel, or other place on the automobile on which the signal is used within convenient reach of the operator of the automobile.

A further object of the invention is the provision of an operating mechanism of the character described which will be compact in form and in which a tubular housing for a pair of solenoids that are used in the mechanism also serves as a means for supporting the associated signal on the automobile and as a part of the electric circuit that is used for operating the solenoids.

A still further object of the invention is the provision of a signal operating mechanism of the character described which is adapted to maintain the associated signal normally in neutral or non-signaling position and which also affords facilities for controlling an electric circuit for operating an electric lamp for illuminating the signal so that the lamp will be lighted only when the signal is in a signalling position.

Other objects and advantages of the invention will be apparent from the following description, considered in conjunction with the accompanying drawings, in which—

Figure 1 is a perspective view of a portion of an automobile equipped with a direction indicating signal and a signalling operating mechanism embodying the invention, Figure 2 is a longitudinal vertical section through the signal operating mechanism, Figure 3 is a diagram of an electric circuit that may be used for operating the improved signal operating mechanism, and Figure 4 is a perspective group view of the principal operating members of the signal operating mechanism with the housing members omitted.

In carrying out the invention, I provide a tubular housing 1 that is made of iron, steel or other suitable electrical conducting material. A tube 2 of brass or other suitable non-magnetic material is disposed within the tube 1 and may be maintained in spaced concentric relation with the tube 1 in any suitable manner, as by means of inwardly extending tubular bosses 3 and 4 on the heads of the screw caps 5 and 6, respectively, which may fit on the opposite ends of the tubular housing 1. A pair of solenoids 7 encircle the tube 2 between the latter and the tube 1, the outer ends of the solenoids terminating substantial distances from the ends of the tube 2. Electrical insulating discs or washers 8 may be disposed on the tube 2 against the inner ends of the solenoids 7 and are spaced apart by an iron washer 9. Electrical insulating discs 10 may be disposed on the tube 2 against the outer ends of the solenoids and maintained thereagainst by iron washers 11 which are retained in place by collars 12. The collars 12 may be secured to the tube 2 by screws 13 which may extend through a wall of the tube 2 into engagement with tubular bearings 14, which are within the tube 2, and thus serve to retain the bearings 14 in place in the tube 2. The washers 11 and 9 also aid in maintaining the tube 2 in spaced concentric relation with the tube 1 and the bearing members 14 have another function which will be presently stated.

An iron plunger or core 15 that is common to both the solenoids is reciprocable in the tube 2 between the bearing members 14 and has non-magnetic stems 16 and 17 extending from its opposite ends through the bearings 14. The outer end portion of the stem 16 is reduced as indicated at 18, thus producing a shoulder at 19 which is flush with the outer end of the adjacent bearing member 14 when the plunger 15 is in neutral position and the ends of the plunger are the same distance from the adjacent stops 14 as shown in Figure 2. An inwardly extending stop ring 20 is disposed at one end portion of the tube 2 adjacent to the outer end of the stem 16—18. A stop ring 21 also is secured on the outer end portion of the part 18 of the one stem of the solenoid plunger. An inner stop ring 22 and an outer stop ring 23 are slidable on the reduced portion 18 of the one stem of the solenoid plunger between the shoulder 19 and the stop 21. The rings 22 and 23 have flanges 22ª and 23ª, respectively, of sufficient diameter to abut the adjacent bearing member 14 and the stop ring 20, respectively when the rings 22 and 23 are at the limits of their movements apart on the reduced portion 18 of the one solenoid plunger stem in response to the actuation of a compression spring 24 which encircles the part 18 of the plunger stem 16—18 between the flanges 22ª and 23ª of the rings 22 and 23, respectively, whereby the solenoid plunger 15 normally will be maintained in an intermediate position with respect to the opposite ends of the solenoids, as shown in Figure 2.

The outer end of the stem 17 is connected with a head 25 which is slidable in the outer end portion of the tube 2 and has circumferentially extending teeth 26. The tube 2 is cut away at one side of the head 25, which may be termed a rack. The tube 1 is formed adjacent to the laterally cut away portion of the tube 2 with a laterally offset integral tubular bearing 27 which extends at right angles with the tube 1 and which therefore is vertically disposed when the tube 1 is horizontal as shown in Figures 1 and 2. The lower end portion of the tubular bearing 27 depends below the tube 1 and is closed at its lower end as indicated at 28 while the upper end portion of the tubular bearing 27 extends above the tube 1 and is open. A tubular shaft 29 depends in the tubular bearing 27 and may carry a nut 30 which has a bearing on the upper end of the tubular bearing member 27. The lower end portion of the tubular shaft 29 depends within the tubular bearing 27 through the laterally cut away portion of the tube 2 adjacent to the rack head 25 and has vertical teeth as indicated at 31 in Figures 2 and 4 in mesh with the teeth of the rack head, whereby the tubular shaft 29 will be turned about its axis when the solenoid plunger is reciprocated or moved longitudinally in the tube 2. The tubular shaft 29 is formed of electrical conducting material. A lamp supporting shaft 32 that is made of electrical conducting material extends through the tubular shaft 29 into a hollow signalling body 33 that is supported on the upper end of the tubular shaft 29 and carries an electric lamp 34 within the signal body. The lower end portion of the shaft 32 depends below the lower end of the tubular shaft 29 and has a bearing at its lower end in a socket or cup 35 of insulating material in the lower portion of the tubular bearing 27. The shaft 32 also is insulated from the shaft 29 and one terminal of the electric lamp is grounded on the tubular shaft 29 as indicated at 36 in the diagram in Figure 3, and thus connected electrically with the tubular housing 1. The shaft 32, of course, is rigid with the shaft 29 and the other terminal of the electric lamp is connected electrically with the shaft 32. The shaft 32 below the lower end of the tubular shaft 29 carries a cam-shaped contact 37 which is out of contact with both of a pair of spaced spring contact fingers 38 when the solenoid plunger is in its neutral position as shown in Figures 2 and 4. However, when the solenoid plunger is moved to the left against the left-hand stop 14, the shafts 29 and 32 will be turned as a unit through approximately one quarter of a revolution and the cam contact 37 will contact with the left-hand spring contact finger 38. When the solenoid plunger is moved to the right, from the position shown in Figure 2, against the right-hand stop 14, the cam contact will be turned to position to contact with the right-hand spring contact 38. The respective spring contacts 38 are supported within the tubular housing 1 on blocks 39 of insulation and respectively are connected by electrical conducting wires 40 and 41 with spaced stationary contacts 42 and 43, respectively of a double-throw switch which may be secured on the instrument board of the automobile with which the signal operating mechanism is used. The wires 40 and 41 may extend within the tubular housing 1 between the latter and the tube 2 for part of the length of the tubular housing 1 and may protrude from the tubular housing 1 through an outlet, as at 44 in Figures 1 and 2, and, of course, the wires 40 and 41 are insulated from the tubular housing 1.

The signal body 33 may have a pair of opposite substantially parallel vertical sides or lenses, as at 45, which have oppositely turned direction indicating means thereon as indicated at 46 and 47, respectively in Figure 1 and the members 45 may be glass panels with the signal or direction indicating members 46 painted or otherwise produced thereon or the members 45 may be principally opaque with the members 46 translucent or transparent, all as well known in the art.

The tubular housing 1 may be secured to a metallic frame member 49 of an automobile 48 by a bracket 50, which also is of electrical conducting material, so that the tubular housing 1 will extend laterally of the associated frame member of the automobile with the signal carrying end portion of the tubular housing 1 outermost, as shown in Figure 1. One of the solenoids has one terminal thereof connected electrically by suitable wires 51 with the aforesaid wire 41 and the corresponding terminal of the other solenoid 7 is connected electrically by a wire 52 with the wire 40. The other terminals of the solenoids have ground connections, as at 53 with the tubular housing 1 and the latter is connected electrically through the metallic frame of the automobile with one side of a battery 54 which may be part of the usual equipment of the automobile. The other side of the battery 54 is connected by an electrical conducting wire 55 with a pivoted switch arm 56 of the aforesaid double-throw switch, the switch arm 56 being adapted to cooperate with the contact 42 to close the circuit for one of the solenoids and to cooperate with the contact 43 to close the circuit for the other solenoid, all as clearly shown in Figure 3. When the solenoid plunger is in its neutral position as shown in Figures 2 and 4, the signal faces 45 of the signal member 33 are parallel with the longitudinal axis of the automobile and the signal body 33 is in its non-signalling or inactive position. When the left hand solenoid of Figure 2 has been energized, the solenoid plunger is permitted to move to the left a distance sufficient to cause the signal body 33 to turn through one quarter of a revolution so that one of the signal faces 45 of the signal 33 will be turned toward the rear of the automobile and the other signal face 45 will be turned toward the front of the automobile. This rotationable movement of the signal and its supporting shaft will cause a like turning movement of the lamp supporting shaft 32 and of the cam 37 which will contact with one of the spring contacts 38, thus closing the circuit for energizing the lamp and assuring the illumination of the signal. As soon as the solenoid is de-energized, the spring 24 will function to return the solenoid plunger to its neutral position and the lamp circuit also will be broken. When the right hand solenoid of Figure 2 is energized, the consequent movement of the solenoid plunger 15 will cause turning of the signal 33 about the axis of its supporting shaft to 90 degrees in the direction opposite to the direction of turning of the signal when the left-hand solenoid has been energized and the cam contact 37 will cooperate with the second spring contact finger 38 to close the lamp circuit.

Obviously, the invention is susceptible of embodiment in forms other than that which is illustrated in the accompanying drawings, and I therefore consider as my own all such modifications and adaptations thereof as fairly fall within the scope of the appended claims.

I claim:—

1. In a signal operating mechanism, a housing, a movable signal member, means for movably mounting the signal member on the housing, solenoids disposed within said housing, a plunger extending through said solenoids and common thereto, stops for limiting the reciprocating movements of said plunger, one end of said plunger extending past one of said stops, cooperating means on said plunger and said signal member for actuating the signal when said plunger is reciprocated in either direction by said solenoids, the opposite end of said plunger extending past the other of said stops, and additional stop carried at the free end of the latter end of said plunger, and means carried on the latter end of said plunger and operable thereon between said additional stop and the adjacent of the first-mentioned stops to maintain the plunger in an intermediate position with respect to said solenoids when the same are deenergized.

2. In a signal operating mechanism, a housing, a movable signal member, means for movably mounting the signal member on the housing, solenoids disposed within said housing, a core common to said solenoids and movable through the same, stops for limiting the reciprocating movements of said core, a reduced extension at one end of said core and projecting through one of said stops, cooperating means on said reduced extension and said signal member for actuating the signal when said core is reciprocated in either direction by said solenoids, a reduced extension formed at the opposite end of said core and projecting through the other of said stops, an additional stop carried on the free end of the latter extension of said core, means carried on the latter extension of said core and operable thereon between said additional stop and the adjacent of the first mentioned of said stops to maintain the core in an intermediate position with respect to said solenoids when the same are deenergized, and another stop cooperative with said means to limit the operative movement thereof in one direction.

3. In a signal operating mechanism, a housing, a movable signal member, means for movably mounting the signal member on the housing, solenoids disposed within said housing, a core common to said solenoids and movable through the same, stops cooperating with the opposite end of said core to limit the reciprocating movements thereof, a reduced extension at one end of said core and projecting through one of said stops, cooperating means on said reduced extension and said signal member for actuating the signal when said core is reciprocated in either direction by said solenoids, a reduced extension at the opposite end of said core and projecting through the other of said stops, an additional stop carried on the free end of the latter extension of said core, resilient means carried on the latter extension of said core and operable between said additional stop and the adjacent of the first-mentioned of said stops to maintain the core in an intermediate position with respect to said solenoids when the same are de-energized, and an annular stop cooperative with the said means to limit the operative movement thereof in one direction.

4. In a signal operating mechanism, a tubular housing, a movable signal member, means for movably mounting the signal member on the housing, a pair of solenoids disposed within the tubular housing, a non-magnetic tube extending through said solenoids, a plunger slidable in said non-magnetic tube and common to both of said solenoids, stops in said non-magnetic tube for limiting the reciprocation of said plunger, a stem extending from said plunger past one of said stops, cooperating means on said stem and said signal member for actuating the signal when said solenoid plunger moves in said non-magnetic tube, a stem extending from the opposite end of said plunger past the second stop, an additional stop on said non-magnetic tube at the outer end of said second named stem, a pair of slidable stop rings on the outer end portion of said second named stem having flanges for contacting with the adjacent fixed stops, a compression spring extending between the slidable stop rings, and stops on said second named stem for limiting the movement of said slidable stop rings apart in response to the actuation of said compression spring, whereby said solenoid plunger will be yieldingly maintained in an intermediate position with respect to said solenoid when said solenoids are de-energized.

FREDERICK LEONARD MARSH.